US007555288B2

(12) United States Patent
Bowen

(10) Patent No.: US 7,555,288 B2
(45) Date of Patent: Jun. 30, 2009

(54) MOBILE DEVICE CONTROL OF MOBILE TELEVISION BROADCAST SIGNALS FROM BROADCASTER

(75) Inventor: Toby John Bowen, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 510 days.

(21) Appl. No.: 11/380,702

(22) Filed: Apr. 28, 2006

(65) Prior Publication Data

US 2007/0255845 A1 Nov. 1, 2007

(51) Int. Cl.
*H04M 1/663* (2006.01)
(52) U.S. Cl. .................. 455/412.2; 455/411; 455/414.1; 455/423; 705/72
(58) Field of Classification Search .................. 455/411, 455/414.1, 423, 412.2; 705/72
See application file for complete search history.

(56) References Cited

U.S. PATENT DOCUMENTS

| 6,546,427 | B1 |   | 4/2003 | Ehrlich et al. |
|-----------|-----|---|--------|----------------|
| 7,013,145 | B1 | * | 3/2006 | Centore, III ................. 455/454 |
| 2005/0028193 | A1 |  | 2/2005 | Candelore et al. |
| 2006/0177055 | A1 | * | 8/2006 | Yoo ............................. 380/42 |
| 2007/0076874 | A1 | * | 4/2007 | Suleiman et al. ............ 380/243 |

FOREIGN PATENT DOCUMENTS

DE   19718103   6/1998
DE   20014381   11/2000
JP   2004341944   12/2004

OTHER PUBLICATIONS

Sony Ericsson Mobile Communications AB, International Application No. PCT/US06/060465, International Search Report, Jun. 12, 2007.
Sony Ericsson Mobile Communications AB, International Application No. PCT/US06/060465, Written Opinion, Report, Jun. 12, 2007.
International Preliminary Report on Patentability, corresponding to International Patent Application No. PCT/US2006/060465, dated Aug. 18, 2008.

* cited by examiner

*Primary Examiner*—Nghi H Ly
(74) *Attorney, Agent, or Firm*—Frederick D. Bailey; Moore & Van Allen, PLLC

(57) ABSTRACT

Disclosed is a portable mobile communications device that can view a scrambled alternate version of a mobile television program broadcast by a mobile television service provider. The portable mobile communications device includes a mobile television receiver capable of receiving broadcasts from a mobile television service provider. A processor in the portable mobile communications device executes an alternate broadcast application that is communicable with the mobile television service provider. The portable mobile communications device and the mobile television service provider exchange PIN code data that when verified will cause the portable mobile communications device to receive a decode algorithm that can descramble the scrambled alternate version of a mobile television program broadcast by a mobile television service provider.

26 Claims, 4 Drawing Sheets

MOBILE DEVICE CONTROL OF MOBILE TELEVISION BROADCAST SIGNALS FROM BROADCASTER

BACKGROUND OF THE INVENTION

Portable mobile communications devices such as mobile phones are becoming more sophisticated and include many new features and capabilities. One such feature is the capability to receive mobile broadcast television signals or mobile television or the like, such as digital video broadcast-handheld (DVB-H), digital media broadcast (DMB), integrated services digital broadcast-terrestrial (ISDB-T), mobile broadcast multi-cast service (MBMS), or similar technologies. When integrated into a mobile phone, all of the aforementioned technologies utilize a separate mobile television tuner except for MBMS which can be received using the portable mobile communications device existing mobile radio receiver and transmitter.

The convenience factor for receiving such broadcasting is high for mobile users. There are circumstances when the broadcaster may be dependent on viewer/user donations to help offset the cost of broadcasting. For instance, the Public Broadcasting Service (PBS) will frequently hold pledge drives to raise money. During pledge drive periods, normal programming is frequently interrupted to solicit donations to PBS. While this may be a necessary and effective tool for PBS it can be irritating to viewers especially if they have already pledged a donation.

Currently, there are no provisions addressing the user's dilemma described above. What is needed is a mechanism that allows the user to receive an alternate broadcast feed from a broadcaster that does not contain pledge drive interruptions provided the viewer has already made a pledge.

BRIEF SUMMARY OF THE INVENTION

In accordance with an embodiment of the present invention, a portable mobile communications device can view a scrambled alternate version of a mobile television program broadcast or a digital audio broadcast (DAB) by a service provider. The portable mobile communications device includes a mobile television or DAB receiver capable of receiving broadcasts from a service provider. A processor in the portable mobile communications device executes an alternate broadcast application. The portable mobile communications device and the service provider exchange PIN code data that when verified will cause the portable mobile communications device to receive a decode algorithm that can descramble the scrambled alternate version of a mobile television program or digital audio broadcast by a service provider.

According to another embodiment of the invention, there is a method of viewing or listening to a scrambled alternate version of a mobile television program or digital audio broadcast by a service provider. A portable mobile communications device receives a PIN code from a service provider wherein the PIN code is associated with the scrambled alternate version of a mobile television program or digital audio broadcast of the service provider. The PIN code is forwarded back to the service provider to obtain a decode algorithm from the service provider. Upon verification of the PIN code, a decode algorithm is received from the service provider and will permit the scrambled alternate version of a mobile television program or digital audio broadcast to be descrambled by the portable mobile communications device. The PIN code can be exchanged between the service provider and the portable mobile communications device via an SMS message, an e-mail message, or through a voice call to a designated telephone number. The decode algorithm can be exchanged over-the-air (OTA) between the mobile television service provider and the portable mobile communications device.

In yet another embodiment, the PIN code can serve as key to unlock an algorithm already resident on the portable mobile communications device. In this scenario, the user enters the PIN code into the alternate broadcast algorithm and if valid a resident algorithm can descramble the alternate broadcast version of a mobile television program or digital audio broadcast.

DETAILED DESCRIPTION OF THE INVENTION

Figure 1:
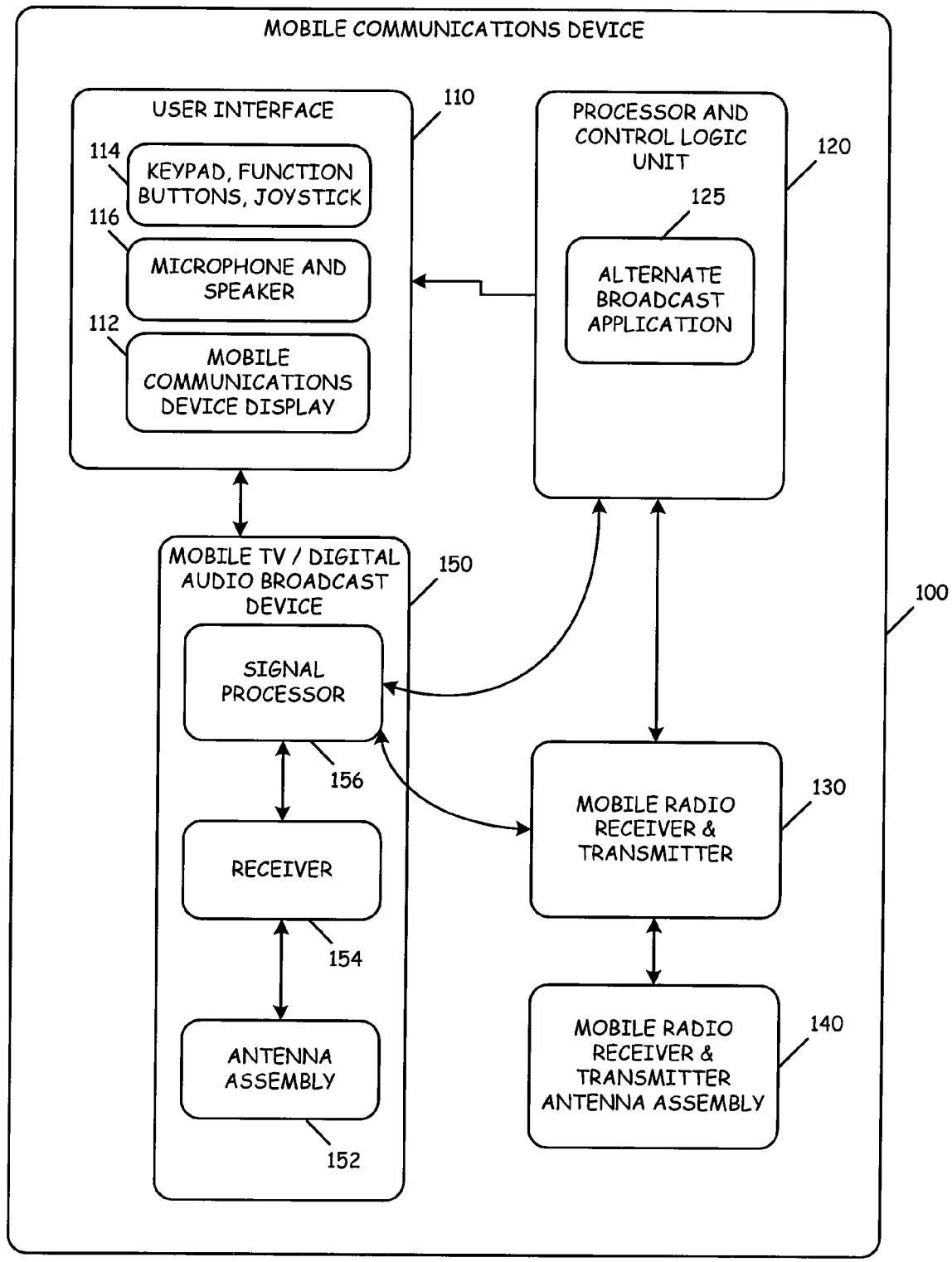
FIG. 1 is a block diagram of an exemplary portable mobile communications device in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary portable mobile communications device in accordance with an embodiment of the present invention.

The portable mobile communications device 100 shown in FIG. 1 may include an operator or user interface 110 to facilitate controlling operation of the portable mobile communications device 100 including initiating and conducting phone calls and other communications. The user interface 110 may include, inter alia, a display 112 to provide visual signals to a subscriber or user as to the status and operation of the portable mobile communications device 100. The display 112 may be a liquid crystal display (LCD) or the like capable of presenting color images. The display 112 may provide information to a user or operator in the form of images, text, numerals, characters, a graphical user interface (GUI) and the like. The display 112 may also be used to present programming carried by the broadcast signals described with respect to methods 300 and 400 of FIGS. 3 and 4, respectively.

The user interface 112 may also include a keypad and function keys or buttons 114 including a pointing device, such as a joystick or the like. The keypad, function buttons and joystick 114 permit the user to communicate commands to the portable mobile communications device 100 to dial phone numbers, initiate and terminate calls, establish other communications, such as access to a mobile television provider, the Internet, send and receive email, text messages and the like. The keypad, function buttons and joystick 114 may also be used to control other operations of the portable mobile communications device 100. The keypad, function buttons and joystick 114 may also be implemented on a touch sensitive display adapted to receive tactile input.

The display 112, keypad, and function buttons 114 may be coupled to a main processor and control logic unit 120. The processor and control logic unit 120 may be a microprocessor or the like. The processor and logic unit 120 may include an application 125 to enable reception of an alternate broadcast and may be embodied in hardware, firmware, software (data structures) or combinations thereof. The processor and logic unit 120 may also include other data structures, software programs, computer applications and the like to encode and decode control signals; perform communication procedures and other functions as described herein.

The user interface 110 may also include a microphone and a speaker 116. The microphone 116 may receive audio or acoustic signals from a user or from another acoustic source. The microphone 116 may convert the audio or acoustic signals to electrical signals. The microphone 116 may be connected to the processor and logic unit 120 wherein the processor and logic unit 120 may convert the electrical signals to baseband communication signals. The processor and control logic unit 120 may be connected to a mobile radio transmitter and receiver 130 that may convert baseband signals from the processor and control logic unit 120 to radio frequency (RF) signals. The mobile radio transmitter and receiver 130 may be connected to an antenna assembly 140 for transmission of the RF signals to a communication medium or system, such as a mobile radio access network (MRAN) or the like. Mobile radio transmitter and receiver 130 can also receive mobile television broadcasts according to the MBMS standard. In this scenario, the MRAN acts as the mobile television service provider.

The antenna assembly 140 may receive RF signals over the air and transfer the RF signals to a radio receiver 130. The radio receiver 130 may convert the RF signals to baseband signals. The baseband signals may be applied to the processor and control logic unit 120 which may convert the baseband signals to electrical signals. The processor and control unit 120 may send the electrical signals to the speaker 116 which may convert the electrical signals to audio signals that can be understood by the user.

The portable mobile communications device 100 may also include a mobile television or digital audio broadcast (DAB) device 150. The mobile television aspect of device 150 may be a DVB-H type device or the like. The mobile television or DAB device 150 may be integrally formed as part of the portable mobile communications device 100 or may be a separate unit that may be connected and operate in association with the portable mobile communications device 100. The mobile television device or DAB 150 may include an antenna assembly 152 for receiving broadcast signals of programming from a mobile television broadcast network, broadcast radio access network (B-RAN), DAB network, or the like. A receiver 154 may be coupled to the antenna assembly 152 to receive the broadcast signals. A signal processor 156 may receive the broadcast signals from the receiver 154 and convert the signals to a format for presentation on the display 112 or output via speaker 116 of the portable mobile communications device 100. Or, a signal processor 156 may receive the broadcast signals from the receiver 130 and convert the signals to a format for presentation on the display 112 or output via speaker 116 of the portable mobile communications device 100.

Figure 2:
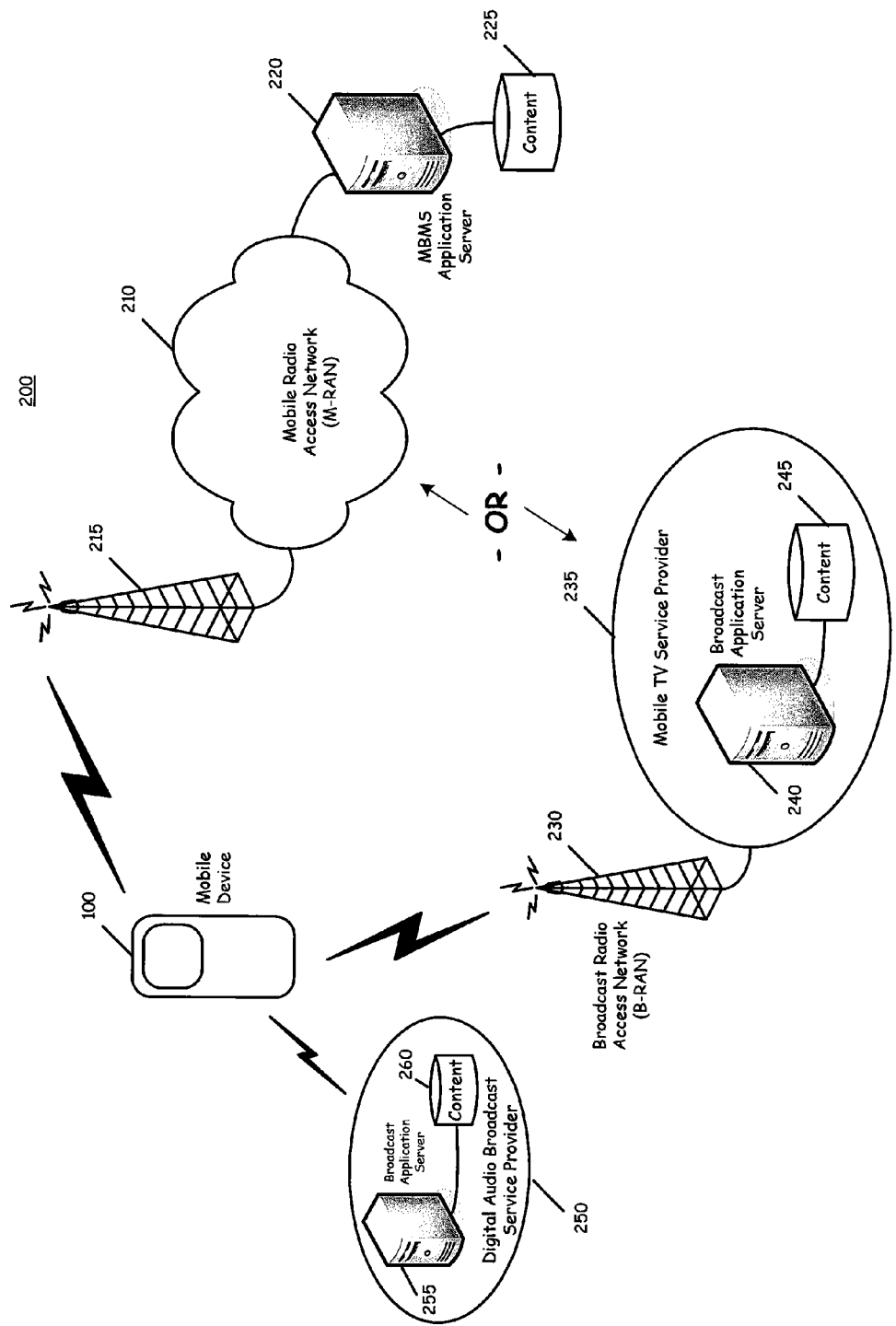
FIG. 2 is a block diagram of an exemplary system for use in accordance with an embodiment of the present invention.

FIG. 2 is a block diagram of an exemplary system for providing and receiving an alternate broadcast of a mobile television program in accordance with an embodiment of the present invention. The system 200 may be a digital video broadcast-handheld (DVB-H), digital media broadcast (DMB), integrated services digital broadcast-terrestrial (ISDB-T), mobile broadcast multi-cast service (MBMS), or other similar technology. When integrated into a mobile phone, all of the aforementioned technologies utilize a separate mobile television tuner except for MBMS which can be received using the portable mobile communications device existing mobile radio receiver and transmitter.

In the case of broadcasts utilizing MBMS, a mobile radio access network (M-RAN) 210 and network of towers 215 serve as the mobile television service provider. The M-RAN 210 includes a broadcast application server 220 that is coupled with a database of content 225 containing the programs to be broadcast including alternate versions of the programs if applicable.

In the case of broadcasts utilizing systems other than MBMS, a generic broadcast radio access network (B-RAN) 230 may originate the mobile television (DVB-H, DMB, ISDB-T, etc.) broadcast signals for broadcasting to communications devices or mobile television devices, such as portable mobile communications device 100 and mobile television device 150. The B-RAN 230 may include a transmitter to transmit the broadcast signals.

The B-RAN 230 may be connected to a mobile television service provider 235. The mobile television service provider 235 may originate programming for broadcasting to communications devices 100 or mobile television devices 150 via the B-RAN 230. The mobile television service provider 235 includes a broadcast application server 240. The broadcast application server 240 is coupled with a database of content 245 that contains the programs to be broadcast including alternate versions of the programs if applicable.

In addition, a digital audio broadcast (DAB) service provider 250 may also include a broadcast application server 255 and database of content 260 which operates in substantially the same manner as described above with respect to B-RAN 230.

Figure 3:
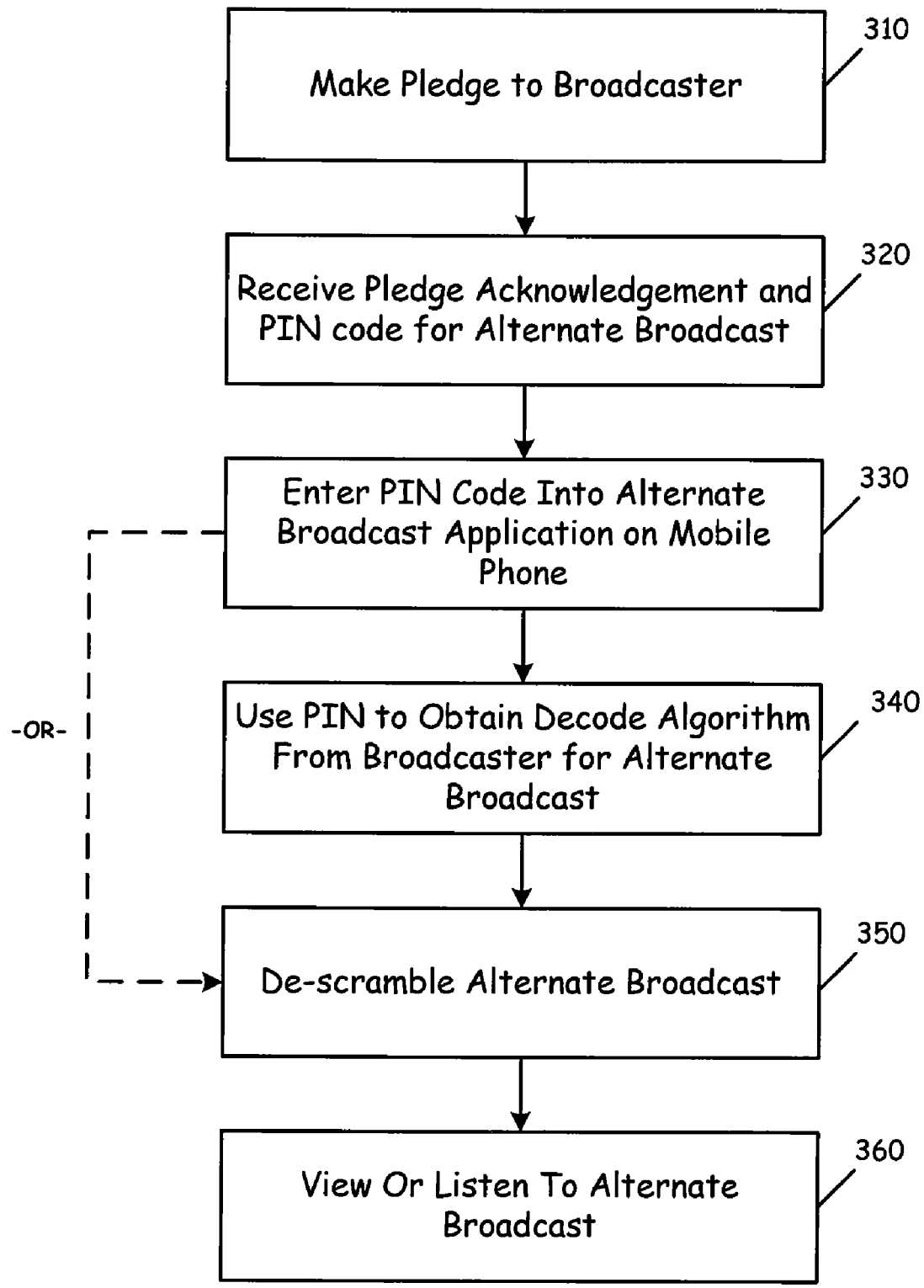
FIG. 3 is a flow chart of a method for providing an alternate broadcast in accordance with an embodiment of the present invention.

FIG. 3 is a flow chart of a method for obtaining an alternate broadcast from a mobile television or DAB service provider in situations where the original broadcast is frequently interrupted by fund raising efforts.

Consider a viewer or listener using a portable mobile communications device such as a mobile phone that tunes into a broadcast that is frequently interrupted by fund raising efforts. The viewer or listener appreciates the broadcaster's position and decides to make a financial contribution pledge 310 to help support the broadcaster. Upon making the pledge, the viewer now wishes he could receive uninterrupted broadcasts for the remaining duration of the pledge drive. The broadcaster after receiving the pledge and verifying the subscription information and identity of the portable mobile communications device, can send an acknowledgement of the pledge along with a PIN code back to the portable mobile communications device via, for instance, an SMS message 320. The purpose of the PIN code is to allow the viewer to obtain a decoding algorithm from the broadcaster that will permit the portable mobile communications device to descramble an alternate parallel broadcast from the mobile television or DAB service provider. The alternate parallel broadcast is uninterrupted by fund raising efforts.

When the viewer receives the PIN code, he can enter it into an alternate broadcast application running on the portable mobile communications device 330. The alternate broadcast application can then forward the PIN code back to the mobile television or DAB service provider in a designated format such as SMS, e-mail, voice call to a designated telephone number, or the like to obtain a descrambling algorithm for the alternate broadcast 340. The descrambling algorithm is then sent over-the-air (OTA) to the portable mobile communications device where the alternate broadcast application applies it to the incoming data stream representative of the alternate broadcast 350. The viewer/listener can now view or listen to the alternate broadcast 350 without having to endure additional interruptions due to fund raising efforts.

In an alternate embodiment, the algorithm or encryption scheme for the alternate version of the television program or digital audio broadcast is already resident on the portable mobile communications device. In this scenario, the user enters the PIN code into the alternate broadcast application 330. The result is that the PIN code serves as a key to unlock or un-encrypt the alternate broadcast directly without having to receive an algorithm from the service provider since the algorithm already resides on the portable mobile communications device.

Figure 4:
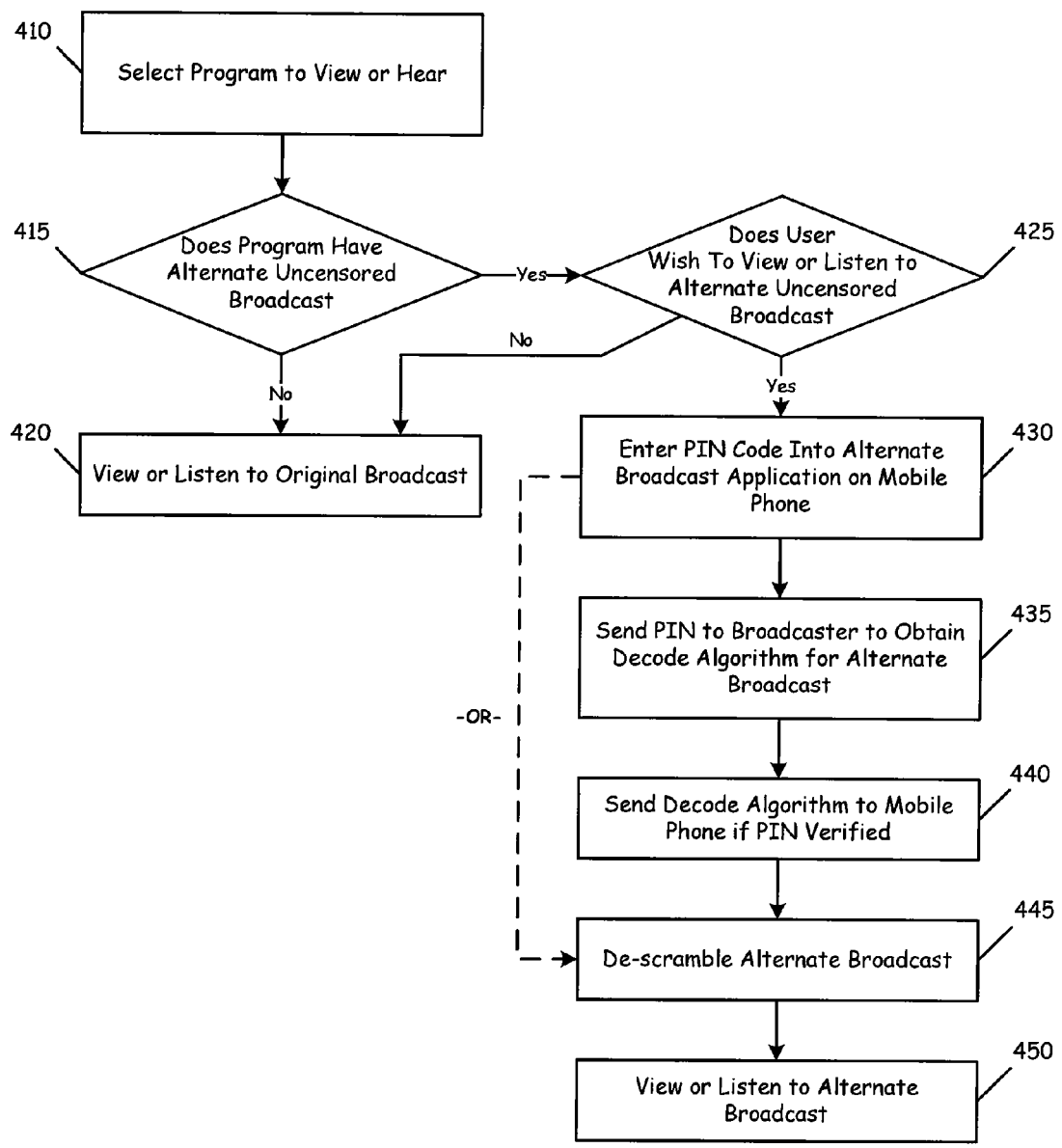
FIG. 4 is a flow chart of another method for providing an alternate broadcast in accordance with an embodiment of the present invention.

FIG. 4 is a flow chart of another method for providing an alternate broadcast in accordance with an embodiment of the present invention. There may be other circumstances in which an alternate version of a program is desired. For instance, some programs may have both censored and uncensored versions. This may often be the case for motion pictures that are broadcast on television, or programming originally broadcast on cable television outlets such as the HBO programs "Sex and the City" or "The Sopranos". Similarly, some audio broadcasts may be censored as well and provide alternative broadcasts for their listeners.

In these situations, the viewer or listener will select a program to watch or listen to on the portable mobile communications device 410. An alternate broadcast application will communicate with the mobile television or DAB service provider to determine if the mobile television service or DAB provider offers an uncensored or commercial-free version of the desired broadcast 415. If there is no alternate broadcast for the desired program then the user will view or listen to the original broadcast normally 420.

If there is an alternate version of the broadcast available, the portable mobile communications device will prompt the user if he wishes to view or listen to the alternate broadcast of the desired program 425. If the answer is no, then the user will view or listen to the original broadcast normally 420.

If the answer is yes, the user can be prompted for a PIN code that is to be entered into the alternate broadcast application running on the portable mobile communications device 430. The PIN code will be sent by the alternate broadcast application to the mobile television or DAB service provider in some predetermined manner 435 that can include SMS, e-mail, voice call to a telephone number, etc. The mobile television or DAB service provider will verify the PIN code and associate it with the subscription information of record for the requesting portable mobile communications device. If the PIN code is valid for the request being made, the mobile television or DAB service provider will send a descrambling algorithm 440 over-the-air (OTA) (or in another manner) to the portable mobile communications device where the alternate broadcast application applies it to the incoming data stream representative of the alternate broadcast 445. The user can now view or listen to the alternate broadcast 450.

In an alternate embodiment, the algorithm or encryption scheme for the alternate version of the television program or digital audio broadcast is already resident on the portable mobile communications device. In this scenario, the user enters the PIN code into the alternate broadcast application 430. The result is that the PIN code serves as a key to unlock or un-encrypt the alternate broadcast directly without having to receive an algorithm from the service provider since the algorithm already resides on the portable mobile communications device.

Any prompts associated with the invention may be presented and responded to via an interactive voice feature, a graphical user interface (GUI) presented on the display of the portable mobile communications device or the like.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. On a portable mobile communications device, a method of outputting a scrambled alternate version of a content broadcast by a service provider, the method comprising:

receiving a content broadcast from a service provider, the content broadcast containing frequent interruptions;

sending a financial pledge to the service provider;

receiving a PIN code from the service provider responsive to the service provider receiving the financial pledge, wherein the PIN code is associated with the scrambled alternate version of the content broadcast by the service provider, the scrambled alternate version of the content broadcast comprising the content broadcast containing no interruptions;

forwarding the PIN code back to the service provider to obtain a decode algorithm from the service provider;

receiving the decode algorithm from the service provider that will permit the scrambled alternate version of the content broadcast to be descrambled by the portable mobile communications device; and descrambling the scrambled alternate version of the content broadcast such that it can be output on the portable mobile communications device.

2. The method of claim 1 further comprising determining whether the service provider offers an alternate version of the content broadcast before sending the financial pledge.

3. The method of claim 2 further comprising verifying that the PIN code is valid.

4. The method of claim 3 wherein the PIN code is exchanged between the service provider and the portable mobile communications device via an SMS message.

5. The method of claim 3 wherein the PIN code is exchanged between the service provider and the portable mobile communications device via an e-mail message.

6. The method of claim 3 wherein the PIN code is exchanged between the service provider and the portable mobile communications device via a telephone call.

7. The method of claim 1 further comprising receiving the decode algorithm in an over-the-air (OTA) exchange between the service provider and the portable mobile communications device.

8. The method of claim 1 wherein receiving a PIN code from a service provider that is associated with the scrambled alternate version of the content broadcast is predicated on making a financial pledge to the service provider.

9. The method of claim 1 wherein the content broadcast is a mobile television program.

10. The method of claim 1 wherein the content broadcast is a digital audio program.

11. On a portable mobile communications device, a method of outputting a scrambled alternate version of a content broadcast by a service provider, the method comprising:

receiving a content broadcast from a service provider, the content broadcast containing frequent interruptions;

sending a financial pledge to the service provider;

entering a PIN code into an application resident on the portable mobile communications device that will permit the scrambled alternate version of the content broadcast to be descrambled, the PIN code being sent to the portable mobile communications device from the service provider responsive to the service provider receiving the financial pledge, the scrambled alternate version of the content broadcast comprising the content broadcast containing no interruptions; and descrambling the scrambled alternate version of the content broadcast such that it can be output on the portable mobile communications device.

12. On a portable mobile communications device, a computer program product embodied on a computer readable medium for outputting a scrambled alternate version of a content broadcast by a service provider, the computer program product comprising:

computer program code for receiving a content broadcast from a service provider, the content broadcast containing frequent interruptions;

computer program code for sending a financial pledge to the service provider;

computer program code for receiving a PIN code from the service provider responsive to the service provider receiving the financial pledge, wherein the PIN code is associated with the scrambled alternate version of the content broadcast by the service provider, the scrambled alternate version of the content broadcast comprising the content broadcast containing no interruptions;

computer program code for forwarding the PIN code back to the service provider to obtain a decode algorithm from the service provider;

computer program code for receiving the decode algorithm from the service provider that will permit the scrambled alternate version of the content broadcast to be descrambled by the portable mobile communications device; and computer program code for descrambling the scrambled alternate version of the content broadcast such that it can be output on the portable mobile communications device.

13. The computer program product of claim 12 further comprising computer program code for determining whether the service provider offers an alternate version of the content broadcast.

14. The computer program product of claim 13 further comprising computer program code for verifying that the PIN code is valid.

15. The computer program product of claim 14 further comprising computer program code for exchanging the PIN code between the service provider and the portable mobile communications device via an SMS message.

16. The computer program product of claim 14 further comprising computer program code for exchanging the PIN code between the service provider and the portable mobile communications device via an e-mail message.

17. The computer program product of claim 12 further comprising computer program code for receiving the decode algorithm in an over-the-air (OTA) exchange between the service provider and the portable mobile communications device.

18. The computer program product of claim 12 wherein receiving a PIN code from the service provider that is associated with the scrambled alternate version of the content broadcast is predicated on making a financial pledge to the service provider.

19. The computer program product of claim 12 wherein the content broadcast is a mobile television program.

20. The computer program product of claim 12 wherein the content broadcast is a digital audio program.

21. On a portable mobile communications device, a method of outputting a scrambled alternate version of content broadcast by a service provider, the method comprising:

receiving a content broadcast from a service provider, the content broadcast containing frequent interruptions;

sending a financial pledge to the service provider;

entering a PIN code into an application resident on the portable mobile communications device that will permit the scrambled alternate version of the content broadcast to be descrambled, the PIN code being received at the portable mobile communications device from the service provider responsive to the service provider receiving the financial pledge, the scrambled alternate version of the content broadcast comprising the content broadcast containing no interruptions; and descrambling the scrambled alternate version of the content broadcast such that it can be output on the portable mobile communications device.

22. The device of claim 21 wherein the content broadcast is a mobile television program.

23. The device of claim 21 wherein the content broadcast is a digital audio program.

24. A system for viewing a scrambled alternate version of content broadcast by a service provider to a portable mobile communications device, the system comprising:

in the portable mobile communications device:

a receiver capable of receiving content broadcasts from a service provider, one content broadcast containing frequent interruptions;

a processor, the processor being configured to send a financial pledge to the service provider;

an alternate broadcast application executable by the processor and communicable with the service provider, wherein the service provider sends PIN code data to the portable mobile communications device responsive to the service provider receiving the financial pledge, the scrambled alternate version of the content broadcast comprising the content broadcast containing no interruptions and being received at the portable mobile communications device such that when the pin code data is verified the portable mobile communications device is configured to receive a decode algorithm that can descramble the scrambled alternate version of the content broadcast by the service provider.

25. The system of claim 24 wherein the content broadcast is a mobile television program.

26. The system of claim 24 wherein the content broadcast is a digital audio program.

* * * * *